United States Patent [19]

Bernard

[11] 4,309,492
[45] Jan. 5, 1982

[54] ELECTRIC STORAGE CELL WITH A VIBRATION-PROOF COMB-TYPE CONNECTION

[75] Inventor: Olivier Bernard, Paris, France

[73] Assignee: Saft-Societe des Accumulateurs Fixes et de Traction, Romainville, France

[21] Appl. No.: 194,846

[22] Filed: Oct. 7, 1980

[30] Foreign Application Priority Data

Oct. 19, 1979 [FR] France .................. 79 26066

[51] Int. Cl.³ .......................................... H01M 2/26
[52] U.S. Cl. .................................. 429/161; 429/178; 429/211
[58] Field of Search ............... 429/161, 160, 158, 211, 429/66, 178

[56] References Cited

U.S. PATENT DOCUMENTS

| | | | |
|---|---|---|---|
| 793,117 | 6/1905 | Witherbee | 429/178 X |
| 1,073,601 | 9/1913 | Gould | 429/161 X |
| 1,297,185 | 3/1919 | Knoblock | 429/161 |
| 2,326,537 | 8/1943 | Hill | 429/161 |
| 2,637,759 | 5/1953 | Shannon | 429/161 |
| 2,702,829 | 2/1955 | Chapel | 429/161 |
| 2,831,910 | 4/1958 | Bates | 429/161 |

*Primary Examiner*—Anthony Skapars
*Attorney, Agent, or Firm*—Kenyon and Kenyon

[57] ABSTRACT

An electric storage cell which includes an electrode block (8) formed by an alternation of active plates of opposite polarities and of separators, each plate being prolonged by a flexible plate lug (12) which projects from one face of the block and acts as a current output, the plate lugs of one polarity being inserted between the teeth (13) of a comb (14) and being welded thereto so as to be stretched between the welds and said face of the block against which the comb presses, the comb being electrically connected to the corresponding output terminal of the storage cell by a flexible connection.

10 Claims, 5 Drawing Figures

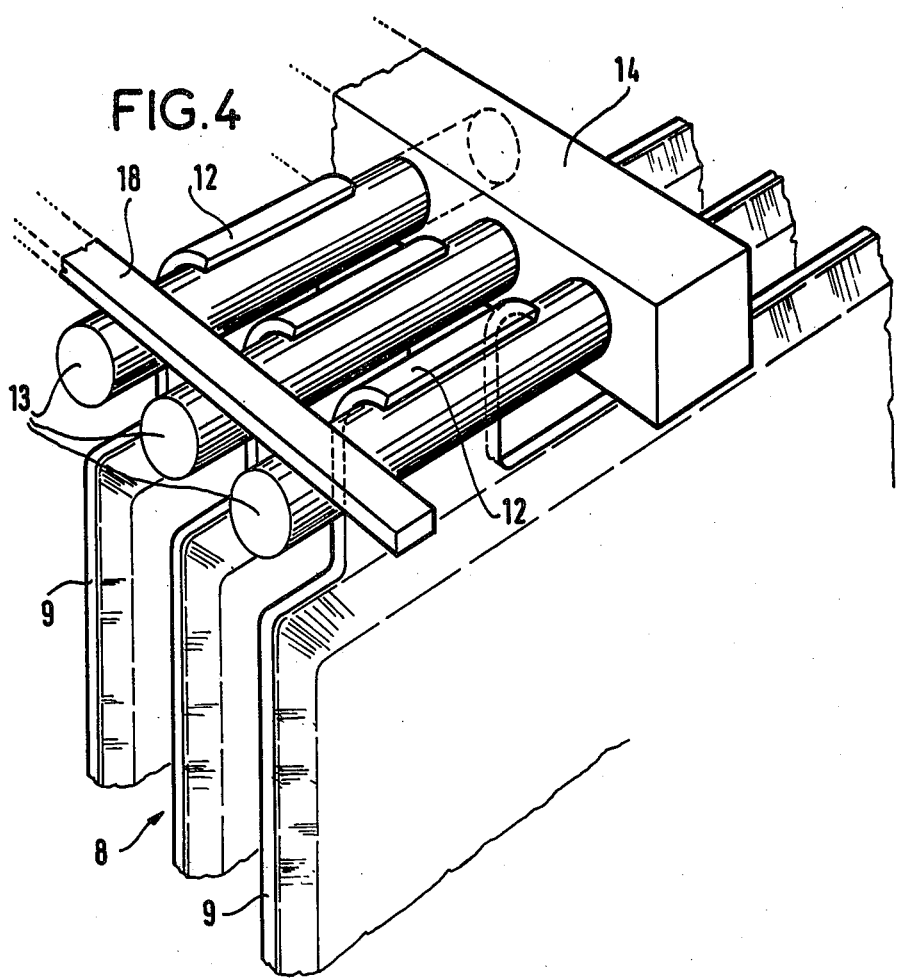
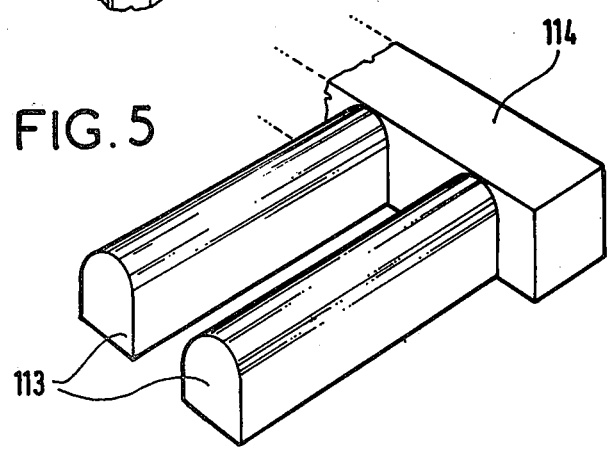

ELECTRIC STORAGE CELL WITH A VIBRATION-PROOF COMB-TYPE CONNECTION

The invention relates to an electric storage cell with a vibration-proof comb-type connection.

BACKGROUND OF THE INVENTION

Electric storage cells are known in which an electrode block is formed by a stack of alternating active plates of opposite polarities separated by separators. The word "block" indicates that the components are clamped together so as to form a compact assembly whose mechanical behaviour is analogous to that of a single component. A flexible lug which acts as a current output extends from each plate. Plate lugs of the same polarity are inserted between the teeth of a comb and are welded thereto, with the comb being electrically connected to the corresponding output terminal of the storage cell. In the majority of cases, the plates are generally rectangular and the plate lugs project from a portion of one side of the rectangle. Such a structure is used in particular with plates of the kind formed by a flat metal support such as a metal sheet and covered on both sides with respective porous layers of sintered metal which are impregnated with active material. The plate lugs are then formed by an extension from the flat metal support and may have a thickness of about 0.1 mm for example. The electrode block is generally parallelepipedal and is inserted in a housing which is also parallelepipedal and which has one face through which there pass the positive and negative output terminals of the storage cell. The output terminals are electrically insulated from the housing if the housing is electrically conductive. Each comb is rigidly connected to the corresponding output terminal, e.g. by direct welding.

When such a storage cell is subjected to sufficiently intense vibrations, even if the electrode block is suitably wedged, the vibrations cause the block to move inside the housing. Since the combs are integrally fastened to the housing via the terminals, such movement applies mechanical stresses to the plate lugs and may break them.

The object of the invention is to mitigate this drawback.

SUMMARY OF THE INVENTION

The present invention provides an electric storage cell comprising: an electrode block formed by a stack of active plates of alternating polarities separated by separators; a housing in which said electrode block is lodged and having a pair of electrical terminals connected to active plates of respective polarities via respective flexible connections to respective ones of a pair of combs resting against one face of the electrode block; each active plate having a flexible plate lug extending therefrom such that the plate lugs of all the active plates are disposed to project from said one face of the electrode block; each plate lug being inserted between the teeth of the corresponding comb and being electrically and mechanically bonded thereto in such a manner as to cause the lugs to be under mechanical tension, thereby holding the combs tightly against said one face of the electrode block.

The comb may press directly against the plates if the geometry of the electrode block allows this without causing a short circuit or it may press against intercalated insulating parts or against the separators. This practically eliminates all possible relative movement between the block and the comb and consequently, there is no stress on the plate lugs. The flexible connection between the comb and the terminal allows for relative movement between the electrode block and the terminal.

Preferably, the teeth of the comb have rounded surfaces and the plate lugs are curved over said surfaces and are bonded to the teeth at their furthest surfaces from the said one face of the electrode block. This disposition has several advantages. The remote location of the bonding from the plates allows easy access during manufacture. The rounded shape of the teeth allows the plate lugs to follow them up to the locations of the bonds without being folded and thereby made fragile. Further, since the lugs are curved, they can withstand residual bending which may still occur due to the relative micro-movement of the plates.

In particular, the teeth may have a cylindrical outer surface.

In accordance with one embodiment, the teeth are constituted by solid or hollow rods fixed to a bar to form the comb. These rods are inserted for example in orifices provided in the bar to which they can be bonded. Generally the bonding is done by welding.

BRIEF DESCRIPTION OF THE DRAWINGS

Embodiments of the invention are described hereinafter in detail by way of non-limiting illustrations with reference to the accompanying drawings.

FIG. 4 is a partial perspective view of the comb and of the positive plates and plate lugs shown in FIGS. 1 and 2.

FIG. 5 is a perspective view of a variant of a comb, which variant may be used in the invention.

FIGS. 1 and 2 illustrate a storage cell with a parallelepipedal metal casing formed by a can 1 and a cover 2 which are welded together. The cover 2 has two output terminals 3 and 4 passing through it which are insulated from the cover by ceramic sleeves 5 brazed to the terminals and to the cover. The bonding between the sleeves 5 and the cover 2 is reinforced by epoxy resin rings 6. The cover 2 also has a filler tube 7. An electrode block 8 of generally parallelepipedal shape is placed inside the casing. It is formed by alternating positive plates 9 and negative plates 17 separated by separators 10. The plates are rectangular. FIG. 1 shows in the foreground a positive plate 9 and, behind it, a separator 10. A plastic spacer 11 presses against the lower surface of the cover 2 and against the upper surface of the block 8 to hold the block by urging downwards. The block may be held fast in the horizontal direction either by a tight fit in the can 1 or by spacers, not shown.

Figure 1:
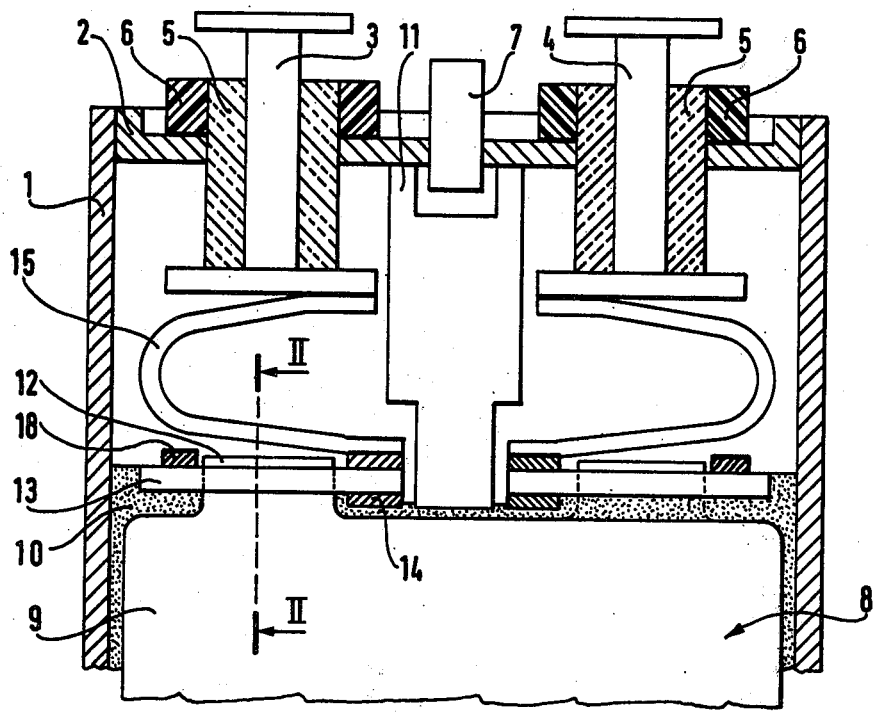
FIG. 1 is a schematic partial cross-section of a storage cell in accordance with the invention.

The positive plates 9 are prolonged by flexible plate lugs 12 which project from the upper surface of the block in the left half of FIG. 1. Likewise, the negative plates are prolonged by plate lugs which project from the same upper surface in the right half of the figure.

Current is collected from the positive plates by a comb formed by teeth 13 and a connecting bar 14 as illustrated in FIG. 4. The plate lugs 12 are inserted between the teeth 13 and welded thereto, while the connecting bar 14 is connected to the terminal 3.

The comb presses against the upper surface of the unit block 8 due to the tension of the plate lugs 12, and a flexible connection 15 connects said comb to the terminal 3, said connection consisting of a U-shaped metal blade whose ends are welded to the connecting bar 14 and to the terminal 3. Further, the teeth 13 are constituted by cylindrical rods inserted in orifices provided in the connecting bar 14 and welded thereto. The lugs 12 are curved along the rounded surfaces of the teeth 13 and are welded at 16 to the top level of the teeth, i.e. as far as possible from the plates and from the separators.

The separators 10 are compressed between the plates and the positive comb, which is thus insulated from the negative plates 17. Further, the separators are more compressed at their portions adjacent the connecting bar 14 than at their portions adjacent the teeth 13, since the connecting bar extends further downwards than the teeth.

Figure 2:
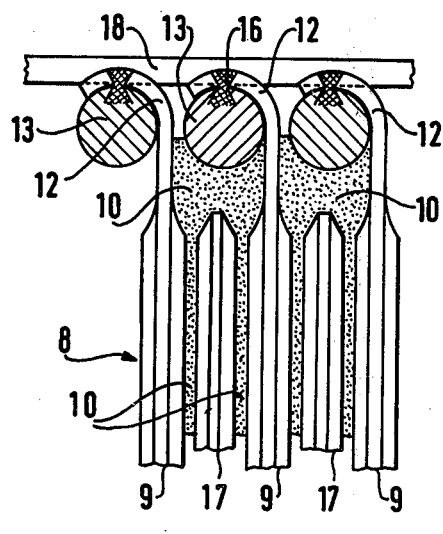
FIG. 2 is a partial cross-section along line II—II of FIG. 1.
Figure 3:
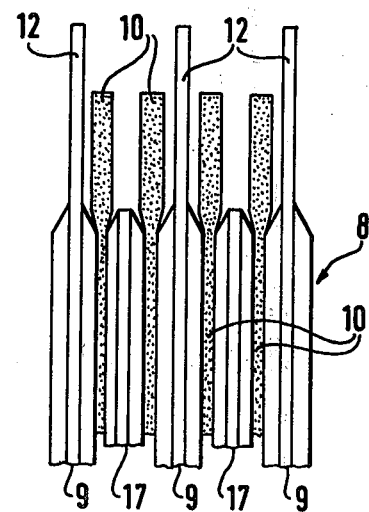
FIG. 3 is a view analogous to FIG. 2 showing the electrode block and the plate lugs before the comb is installed.

FIG. 3 shows the vertical plate lugs 12 and the separators 10 which extend above the plates 9 and 17 before the comb is set in position. When the comb is inserted and caused to press against the block 8, the separators are compressed under the teeth 13 to occupy the available space between said teeth and the plates as illustrated in FIG. 2. Welding the lugs 12 to the teeth 13 then keeps the separators compressed. The lugs are kept taut between the welds 16 and the plates 9.

The rigidity of the comb is reinforced by a metal strip 18 which extends transversely over the teeth 13 and is welded to each of them (see FIG. 4).

The structure of the negative comb and its disposition relative to the electrode block are substantially identical to the arrangement of the positive side.

For clearness' sake in the drawing, the various components are not illustrated to a uniform scale. By way of non-limiting example, the plates 9 and 17 are about 0.9 mm and 0.8 mm thick and are formed by two porous layers of sintered nickel impregnated with nickel hydroxide for the positive plates and cadmium hydroxide for the negative plates. These porous layers cover both sides of a perforated nickel-plated steel strip about 0.1 mm thick which also serves to constitute the plate lugs. The inter-electrode distance, i.e. the thickness of the separator between the plates, is about 0.25 mm. The teeth 13 are stainless rods about 2 mm in diameter, and the connecting bar 14 and the strip 18 are also made of stainless steel. The flexible connection 15 is made of an alloy called nickel 200 which contains at least 99% of nickel and cobalt and no more than 0.15% of carbon, 0.35% of manganese, 0.40% of iron, 0.01% of sulphur, 0.35% of silicon and 0.25% of copper. The shape of the connection 15 does not form a part of the invention. Its function is to allow the relative movement of the comb and of the terminal and it is necessary only to prevent it from becoming the seat of stresses which would make it fragile when subjected to vibrations.

FIG. 5 illustrates a variant of a comb which variant can be used with a storage cell in accordance with the invention instead of the one shown in FIGS. 1, 2 and 4. Said comb, which can be machined in a single part, is formed by teeth 113 and a connecting bar 114 of the same height. Each of the teeth 113 consists of a rectangular parallelepiped with a half-cylindrical top. Contrary to those in FIGS. 1 and 2, the teeth 113 and the connecting bar 114 have lower surfaces located in the same horizontal plane and therefore the separators undergo substantially even compression.

Many other forms of comb are possible, e.g. combs in a single part and whose teeth are in the shape of cylinders, half cylinders or quarter cylinders.

The teeth need not have rounded surfaces and may, for example, be produced by machining straight slots in a plate, the plate lugs then being welded to the (vertical) sides of the teeth or to their upper edges. A storage cell produced in this way is not so resistant to vibration as one with a rounded-tooth comb, but is nonetheless an improvement over the prior art.

Instead of exerting a substantially uniform compression on the separator as in FIG. 5, or a higher compression at the end where the connecting bar is located, as in FIGS. 1 and 2, a comb in accordance with the invention could exert a higher compression at both its ends on either side of the plate lugs and a lower or even zero compression between the plate lugs. This could be provided for by means of a second connecting bar disposed on the farther end of the bar 14 from the teeth 13 or by means of a strip analogous to strip 18 but placed below the teeth or by means of thicker portions at the tooth ends.

The comb can also press directly against the plates instead of against the separators. Of course, this is not possible without short circuiting if the plates are rectangular and disposed as in FIG. 1 and 2, but it becomes possible if the plates are notched in the neighbourhood of the plate lugs of opposite polarity. Further, the comb may press against the plates via interposed insulating parts.

In the above, separator must be understood to mean not only a single sheet of separation material but also several such sheets bonded together which are of identical or different kind and thickness. Further, the various separators of the electrode unit can be formed by a strip folded in an accordian configuration.

I claim:

1. An electric storage cell including a housing; an electrode block lodged in the housing; the electrode block being formed by a stack of active plates of alternating positive and negative polarities and separators interposed between each pair of positive and negative plates, and each active plate having a plate lug extending therefrom, the plate lugs of all the active plates projecting from one face of the electrode block; a pair of electrical terminals extending through a wall of the housing; a pair of conductive comb-shaped members disposed within the housing, means for electrically connecting each comb to a corresponding one of the terminals; and the plate lugs of active plates of each polarity being electrically connected to respective teeth of the corresponding comb, wherein the improvement comprises:

each comb being disposed against said one face of the electrode block;

said means for electrically connecting each comb to a corresponding terminal comprising an elongated flexible element extending from the comb to the corresponding terminal; and each plate lug being flexible, being inserted between adjacent teeth of the corresponding comb, and being electrically and mechanically bonded to one of said teeth under tension, the tension in said lugs holding the combs tightly against said one face of the electrode block.

2. An electric storage cell according to claim 1 wherein at least part of the outer surface of each of the teeth of each comb is rounded, and the corresponding plate lug is curved over said rounded surface and is bonded to the tooth at a location furthest from said one face of the electrode block.

3. An electric storage cell according to claim 2 wherein each comb comprises a bar, and each tooth of the comb is an elongated member having one end fixed to the bar.

4. An electric storage cell according to claim 3 wherein the separators extend beyond the edges of the plates on said one face of the electrode block, and the teeth of each comb are pressed into said separators by the tension in said plate lugs.

5. An electric storage cell according to claim 4 wherein the side of each bar facing the one side of the electrode block extends beyond the associated teeth, thereby compressing the separators to a greater extent under the bars than under the teeth of the combs.

6. An electric storage cell according to claim 3 wherein the entire outer surface of each tooth is cylindrical.

7. An electric storage cell according to claim 6 wherein said bar contains a row of spaced parallel holes, and each of said rods is inserted into one of the holes.

8. An electric storage cell according to claim 7 wherein the rods of each comb are welded to the bar of said comb.

9. An electric storage cell according to claim 1 wherein each of said active plates comprises a flat metal support; a first porous layer of sintered metal covering one side of the support; a second layer of sintered metal covering the other side of the support, each of said first and second layers being impregnated with active material, and wherein each of said plate lugs is formed as an extension of said support.

10. An electric storage cell according to claim 8 wherein each plate support comprises a perforated metal sheet.

* * * * *